United States Patent [19]

Olbrich

[11] Patent Number: 5,378,023
[45] Date of Patent: Jan. 3, 1995

[54] PIPE CONNECTION, PARTICULARLY ON COMPOSITE PIPES

[75] Inventor: Kurt Olbrich, Mossautal, Germany

[73] Assignee: Hewing GmbH, Ochtrup, Germany

[21] Appl. No.: 915,692

[22] PCT Filed: Nov. 29, 1991

[86] PCT No.: PCT/EP91/02261

§ 371 Date: Jul. 21, 1992

§ 102(e) Date: Jul. 21, 1992

[87] PCT Pub. No.: WO92/09840

PCT Pub. Date: Jun. 11, 1992

[30] Foreign Application Priority Data

Nov. 30, 1990 [DE] Germany ............... 9016310[U]

[51] Int. Cl.$^6$ .............................................. F16L 35/00
[52] U.S. Cl. ........................................ 285/24; 285/39;
285/256; 285/259; 285/351
[58] Field of Search ............... 285/256, 259, 910, 918,
285/351, 347, 24, 39

[56] References Cited

U.S. PATENT DOCUMENTS

| | | | |
|---|---|---|---|
| 2,453,997 | 11/1948 | MacWilliam | 285/259 X |
| 2,535,460 | 12/1950 | Rotter et al. | |
| 3,539,207 | 11/1970 | Harris | |
| 4,039,212 | 8/1977 | Skarud | 285/347 X |
| 4,486,035 | 12/1984 | Storke | 285/347 X |
| 4,564,222 | 1/1986 | Loker et al. | 285/347 X |
| 4,593,942 | 6/1986 | Loker | 285/259 X |
| 4,729,583 | 3/1988 | Lalikos et al. | 285/256 X |
| 4,844,516 | 7/1989 | Baker | 285/259 X |
| 5,096,231 | 3/1992 | Chisnell et al. | 285/256 X |

FOREIGN PATENT DOCUMENTS

| | | | |
|---|---|---|---|
| 1273931 | 7/1968 | Germany | 285/256 |
| 1450408 | 7/1969 | Germany . | |
| 3243365 | 5/1984 | Germany | 285/256 |
| 68241 | 6/1978 | Japan | 285/256 |
| 880324 | 10/1961 | United Kingdom | 285/256 |
| 955498 | 4/1964 | United Kingdom . | |
| 992378 | 5/1964 | United Kingdom . | |
| 2177769 | 1/1987 | United Kingdom | 285/256 |
| 2220242 | 1/1990 | United Kingdom . | |

*Primary Examiner*—Dave W. Arola
*Attorney, Agent, or Firm*—Jordan and Hamburg

[57] ABSTRACT

The invention relates to a pipe connection, particularly for composite pipes (2), with a supporting sleeve (4) with at least 6no connection region (3) and an assigned pressure sleeve (6), the supporting sleeve (4) being provided with a shoulder (10) and with main, ring-shaped beads (12), the pressure sleeve (6) embracing the pipe end that is on the connection region (3), the pressure sleeve (6) in each case being constructed as a plastically deformable pressure element and this, in the final state pipe connection (1), brings about with ring-shaped, inwardly directed depression regions (11, 11',11") a sealing immobilization of an associated pipe end. In order to provide a permanently tight connection, the connection region (3) of the supporting sleeve (4) is constructed as a working, support surface, which has an inner supporting part (14) adjoining the shoulder (10), an outer supporting part (15) adjacent to the end of the connection region (3) and an intermediate part (16) of smaller diameter with main ring-shaped beads (12, 12'). Between the inner and outer supporting parts (14, 15), additional ring-shaped beads (13) are provided in the central region of the intermediate part (16). The additional ring-shaped beads (13) are formed in each case by two partial ring-shaped beads, which form between themselves the boundary of an accommodating groove for an elastomeric ring-shaped body (19, 19').

20 Claims, 5 Drawing Sheets

PIPE CONNECTION, PARTICULARLY ON COMPOSITE PIPES

BACKGROUND OF THE INVENTION

The invention relates to a pipe connection, particularly for composite pipes. At best, such a known construction, as described in U.S. Pat. No. 1,825,005, creates a permanently tight connection for fabric-reinforced rubber hoses, but not for plastic or composite pipes, since the design of the connection region of the supporting sleeve does not ensure a reliable immobilization, which is able to cope with the temperature and pressure fluctuations of a medium flowing through the pipe.

For a further, known pipe connection (European patent B-0 159 997), the pipe ends on the connection region of the supporting sleeve are pressure-molded by an intermediate sleeve, which in turn is molded in axial and radial directions by a shaping ring, as the latter is pushed onto the intermediate sleeve, and exerts strong axial and radial pressing effects on the walls of the pipes. For such a construction, for which the material of the intermediate sleeve has to fill up completely the space between the inside of the shaping ring and the outside of the pressure-molded pipe end and, at the same time, experiences bilateral deformations, high pressures are required for installing the pipe connection. These high pressures adversely affect the structure of the pipe wall material and decrease the strength and sealing function of this material. Moreover, the applying of such high pressures at building sites is problematical. Such pipe connections are therefore expensive to install. They require precision-made intermediate sleeves and shaping rings and are hardly able to compensate for the tolerances in the cross sectional dimensions of the pipes that are permitted by the Standards Association. The expensive design of the pipe connection with the intermediate sleeve and the shaping ring increases the overall diameter of the pipe connection appreciably.

SUMMARY OF THE INVENTION

It is an object of the invention to provide a pipe connection particularly for composite pipes, which brings about a permanently secure and tight connection of pipes with little expenditure for construction and installation.

The invention creates a pipe connection with a deformable, external pressure sleeve, which provides an end region of the pipe, which is between this pressure sleeve and a connection region of the supporting sleeve, With an undulating deformation with zones of different compaction while avoiding stress concentrations, and brings about a gentle, structure-retaining, reliably sealing immobilization of the end of the pipe. An elastomeric ring-shaped body can act as a holding element for the supporting sleeve, as a sealing ring directly opposite a depression and/or as a separating and sealing element between the front end of a composite pipe and the shoulder of the supporting sleeve. The external diameter in the region of this pipe connection is enlarged only insignificantly relative to the external diameter of the pipe ends. Due to the gentle deformation of the end regions of the pipe, such a pipe connection can be used particularly for composite pipes, especially aluminum/-plastic composite pipes, since there is no damage due to cutting or shearing effects or to stress concentrations in the region of pressure.

With respect to significant further advantages and details of the invention, reference is made to the following specification and the drawing, in which an embodiment of the object of the invention is illustrated diagrammatically in greater detail. In the drawing,

DESCRIPTION OF THE PREFERRED EMBODIMENTS

Figure 1:
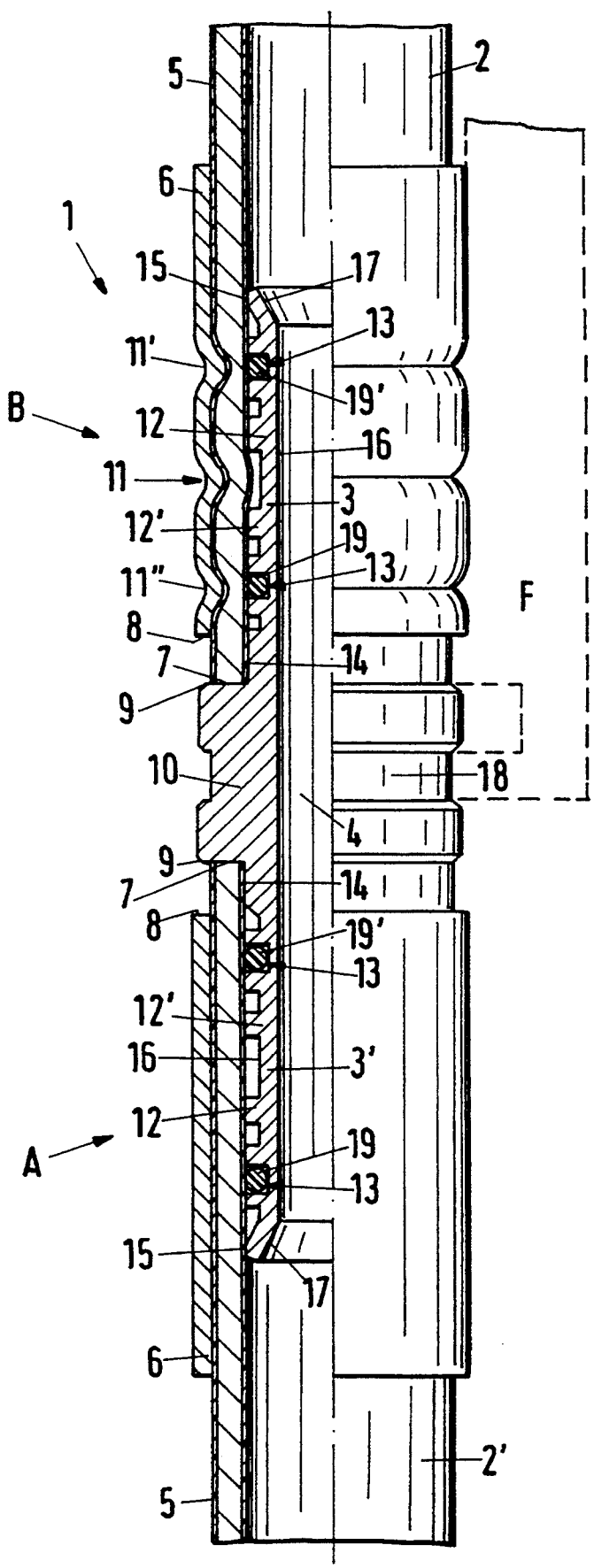
FIG. 1 shows a partial axial section of an inventive pipe connection with two connection regions in an uncompressed state in region A and in a compressed state in region B.

FIG. 1 shows a pipe connection for two composite pipes 2, 2'. The pipe connection, which is labeled I as a whole, comprises a supporting sleeve 4 with two connection regions 3, 3', on which the ends of the composite pipes 2, 2' can be mounted, which have a cylindrical, outer surface shell 5 in the undeformed state A. The ends of the composite pipes 2, 2' are in each case embraced by a pressure sleeve 6, which in the built-in position, which is illustrated in state A, forms a cylindrical body of constant diameter. In this pre-installed, built-in state, the end faces 7 of the composite pipes 2, 2' are pushed forward until they come up against radially projecting side walls 9 of a shoulder 10 of the supporting sleeve 4. An end face 8 of each pressure sleeve 6 can remain at a distance from the shoulder 10, without affecting the tightness.

The deformed state B in the representation of FIG. 1 illustrates that the pipe connection 1, starting out from the undeformed state A of the individual parts, is formed owing to the fact that the pressure sleeves 6, which are constructed as plastically, cold deformable pressure elements, in the final stage of the pipe connection 1 get annular depression regions 11, 11', 11", which, in an appropriate embodiment of the installation, are introduced by means of a shaping pressing tool, the details of which are not shown. This cold, plastic deformation is permanent in nature.

As a pressing tool, a jointing clamp with molding jaws F can be used, which is closed in two, three or four positions of application, which are offset by a 90°, 120° or 180° central angle and accordingly ensure a uniform, circular deformation. For this operation, the pressing tool is centered by the side walls 9 of the shoulder 10 and the pipe-side end 8 of each pressure sleeve 6, the molding jaws F being provided with appropriate centering grooves or centering prongs (not shown).

In order to attain a sealing immobilization of the pipe ends on the connection regions 3,3' of the supporting sleeve 4, main ring beads 12, 12' on the supporting sleeve 4 are assigned to these depression regions 11, 11', 11" in such a manner, that the pipe ends on the connection regions 3 get an undulating deformation between the supporting sleeve 4 and the pressure sleeve 6. At the same time, they lie under pressure at the mutually facing surfaces of the supporting sleeve 4 and the pressure sleeve 6.

In an appropriate embodiment, three depression regions 11, 11', 11" of the respective pressure sleeve 6 are assigned offset in staggered fashion in each case to two main ring-shaped beads 12, 12' on the corresponding connection region 3, 3' of the supporting sleeve 4.

Figure 3:
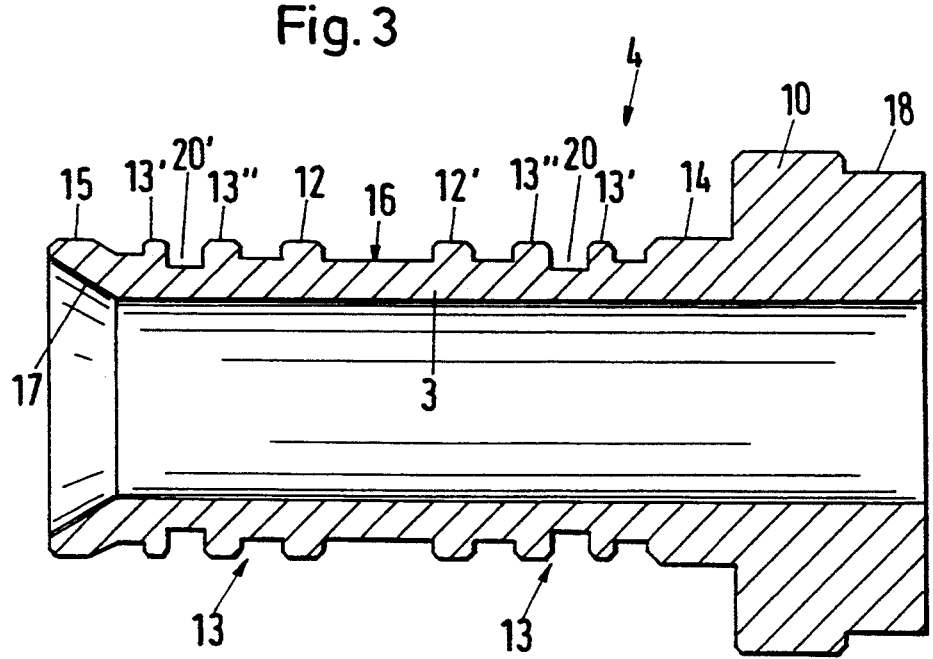
FIG. 3 shows an enlarged, detailed representation of a connection region of the supporting sleeve of FIG. 2.
Figure 4:
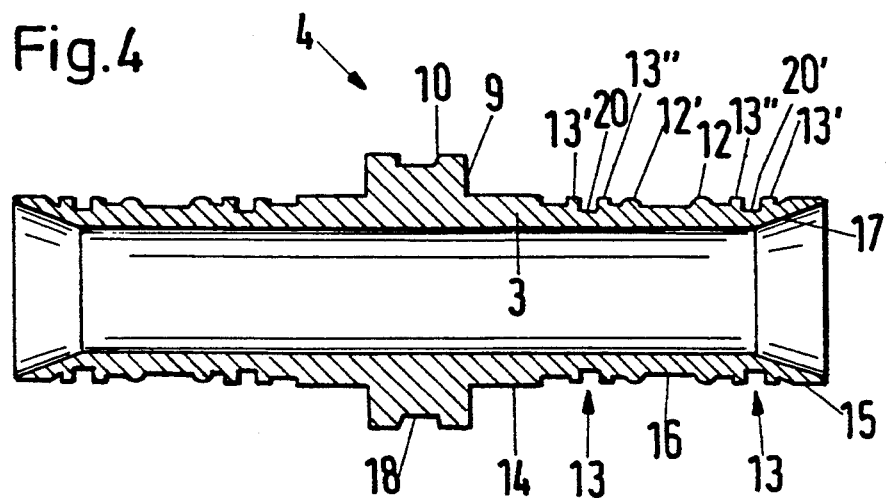
FIG. 4 shows a detailed representation of the supporting sleeve with modified main ring-shaped beads.
Figure 5:
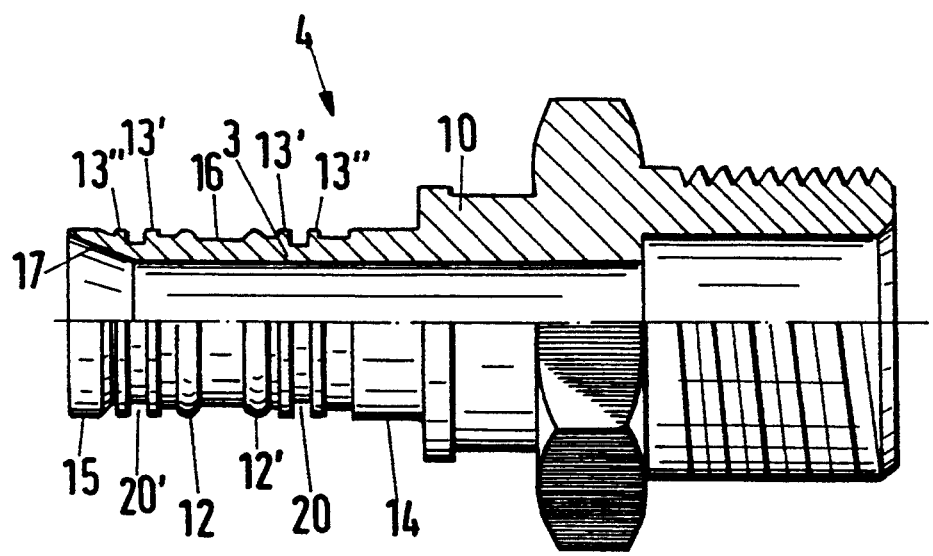
FIG. 5 shows a detailed representation of the connection region of FIG. 4 for a one-sided pipe connection, FIGS. 6 to 8 each show a diagrammatic representation of different connecting phases of the pipe connection in the region of the collar.

For the further improvement of the load-carrying ability of the pipe connection 1, as well as its tightness, additional ring-shaped beads 13, disposed on either side of the main ring beads 12, 12' at a distance from one another, are provided on the connection regions 3, 3' of the supporting sleeve 4. These additional ring-shaped beads 13 are formed in each case by two partial ring beads 13', 13", which between themselves form the boundary of a groove 20 for accommodating an elastomeric ring-shaped body 19, 19' and which are provided with essentially the same radial dimensions, which correspond to those of the main ring beads 12, 12' (FIGS. 3 to 5).

Figure 9:
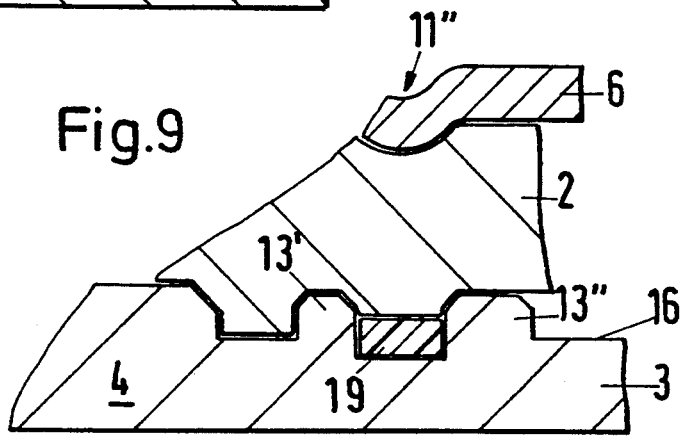
FIG. 9 shows an enlarged, sectional representation of a depression region in the region of an accommodating groove with a ring-shaped body, FIGS. 10 and 11 each show a cross section of the supporting sleeve in the region of an internal supporting part with profiles to safeguard against twisting

In this connection, the depression regions 11', 11" are preferably disposed radially aligned with the accommodating grooves 20, 20' or the ring-shaped bodies 19, 19' in these grooves 20, 20' in such a manner that, by means of the pressure sleeve 6, the pipe material gets a deformation zone, which engages the accommodating groove 20, 20' and forms with the elastic ring-shaped body 19, 19' a creep resistant sealing region (FIG. 9), in which even grooves in the end of the pipe experience a sealing.

In order to bring about a gentle, undulating deformation of the pipe wall, the axial distance between the main ring-shaped beads 12, 12' is designed to be larger than their distance from the additional ring-shaped beads 13 (FIGS. 2 to 5). In the example shown, the main ring-shaped beads 12, 12' in each case project in the radial direction by 0.8 mm beyond the area regions of the supporting sleeve 4 adjoining them. The distance between the main ring-shaped beads 12, 12' is about 4.5 mm and the distance in the axial direction between the main ring-shaped beads 12 and the additional ring-shaped beads 13, 13' is dimensioned at about 3 mm for the pipe connection 1 for composite pipe 2 that is shown. Depending on the nominal size of the pipes, the distances between the main ring-shaped beads 12, 12' can in each case be 4 to 15 mm and the distances to the additional ring beads 13, 13' can in each case be 3 to 12 mm. The size of the projection of the main ring-shaped beads 12, 12' can also vary correspondingly between 0.5 and 1.5 mm.

Between the partial ring beads 13', 13", there is the accommodating groove 20, 20' with a depth of 0.6 to 1.2 mm and preferably of 0.9 min. In the uncompressed starting position, the respectively assigned elastomeric ring-shaped body 19, 19' is disposed with axial clearance between the two partial ring-shaped beads 13', 13", so that the accommodating groove 20, 20' can be filled up sufficiently in the compressed state. The above described dimensioning is appropriately modified for pipes with different diameters.

Figure 6:
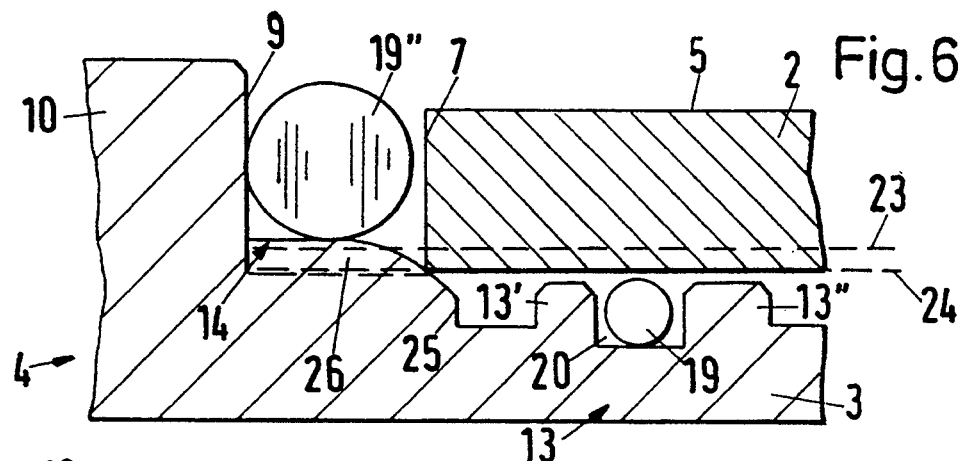

In FIG. 6, the elastomeric ring-shaped body 19 is dimensioned in such a manner, that its cross sectional area is less than the cross sectional area of the accommodating groove 20 and that, in the compressed state (FIG. 9), the ring-shaped body 19 is elastically deformed.

Figure 7:
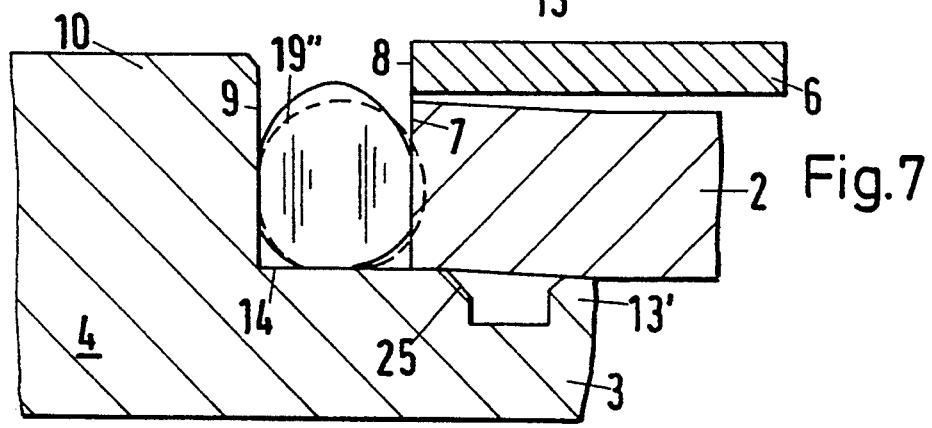
Figure 8:
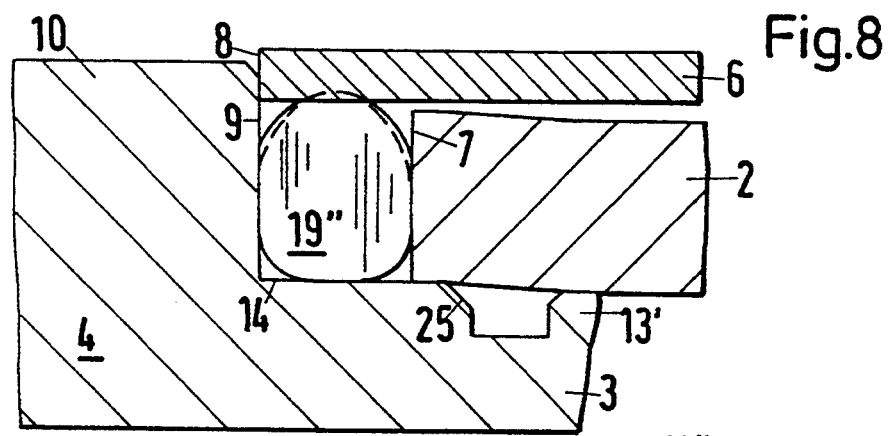

With the construction of the ring-shaped body 19, 19' with a ring diameter 21, which protrudes over the diameter 22 of the supporting sleeve 4 in the pre-installed, built-in state (FIG. 2), the supporting sleeve 4 can be brought advantageously, in a further pre-installation phase, into the composite pipe 2, for example by hand. For this purpose, the ring-shaped body 19, 19' acts as a holding element for the supporting sleeve 4 as a whole, so that accordingly the pipe connection 1 can easily be completed without an additional holding device (FIGS. 6 to 8).

Preferably, the respective connection regions 3, 3' of the supporting sleeve 4 in the various embodiments of FIGS. 2 to 5 comprise a cylindrical inner part 14, which adjoins the shoulder 10, a cylindrical outer part 15 of the same or a smaller diameter and an intermediate part 16, in which the annular ring-shaped beads 12, 12', 13, 13', 13" are disposed.

The representations make it clear that the connection regions 3, 3' have at their outer ends internally a conical hub 17, which essentially is taken to the outer surface of the outer part 15 of the connection region 3, 3', so that a flow-favoring transition to the inner wall of the composite pipe 2 results.

Figure 2:
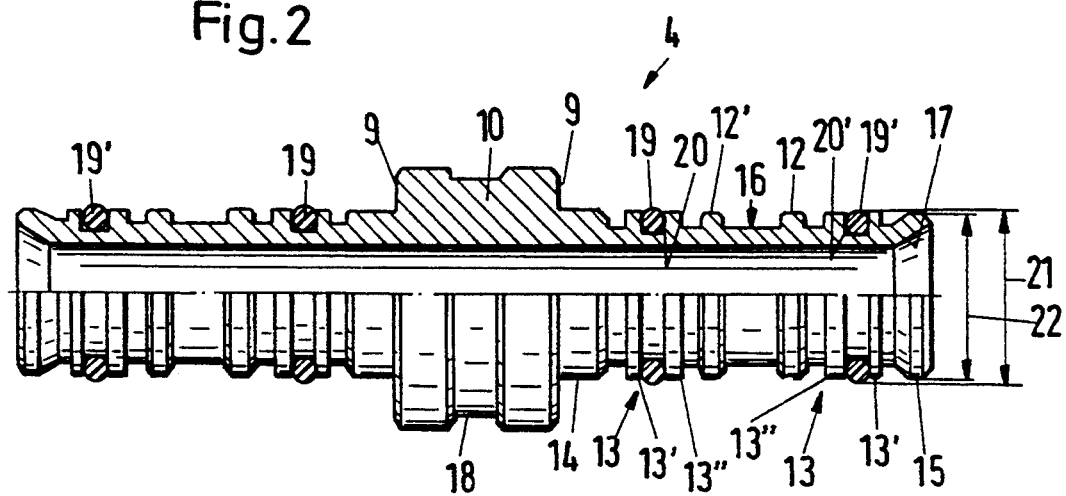
FIG. 2 shows a detailed representation of a supporting sleeve of FIG. 1 with pre-installed ring-shaped bodies.

In the manner evident from FIGS. 2 to 4, the shoulder 10 of the supporting sleeve 4 can be constructed as a centering shoulder for the pressing tool that forms the depression regions 11, 11', 11" in the pressure sleeves 6. This collar 10, with its radially protruding side walls 9, has approximately the same diameter as the pressure sleeves 6. Moreover, the shoulder 10 can also have a shaped centering groove 18, which runs around the shoulder 10 and the side walls 9 of which can assume the centering function for the molding jaws F (FIG. 1), which in this case are provided with a centering prong, which engages the groove 18.

The pipe connection 1 shown is designed as a connection for coaxial pipe ends; it can, however, also assume the basic shape of other fittings, such as T, angle or curved pieces and can also be equipped with only one connection region 3 for one pipe end (FIG. 3, FIG. 5).

The enlarged representation of the connection region 3 makes it clear that the boundary edges of all parts of the supporting surfaces 14, 15 are beveled (FIG. 3) and the main ring-shaped beads 12, 12' can be formed with a rectangular cross sectional shape (FIG. 3), as well as with a circular peripheral surface (FIGS. 4 and 5).

In the representation of FIG. 6, the connection region 3 of the supporting sleeve 4 is brought almost completely into the composite pipe 2, so that the end face 7 can be pushed forward up to the inner supporting part 14. Lines 23, 24 indicate a possible region of play of the internal diameter of the composite pipe 2. This region of play must be compensated for during the pre-installation by means of the supporting sleeve 4, in order to position the supporting sleeve 4 and the pressure sleeve 6 precisely before the compression is carried out (FIGS. 7 and 8).

Furthermore, the inner supporting part 14 of the supporting sleeve 4 can be constructed with compared to the intermediate part 16 and the outer supporting part 15, and at least regionally larger radial dimension adjacent to a conical abutting surface 25.

Figure 10:
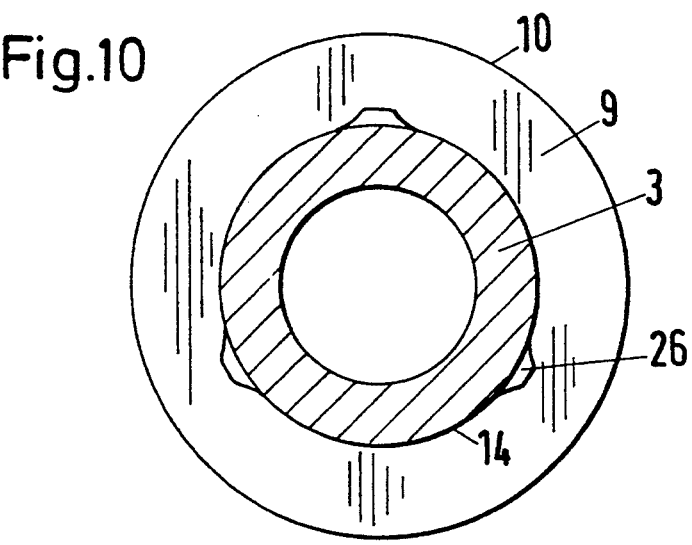
Figure 11:
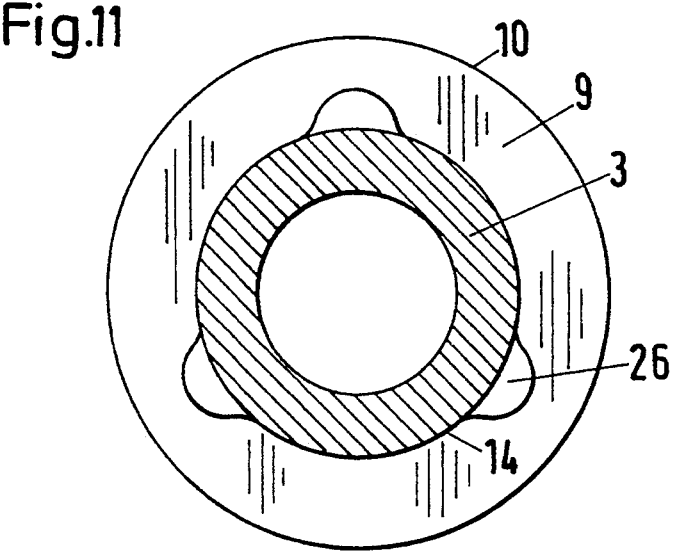
Figure 12:
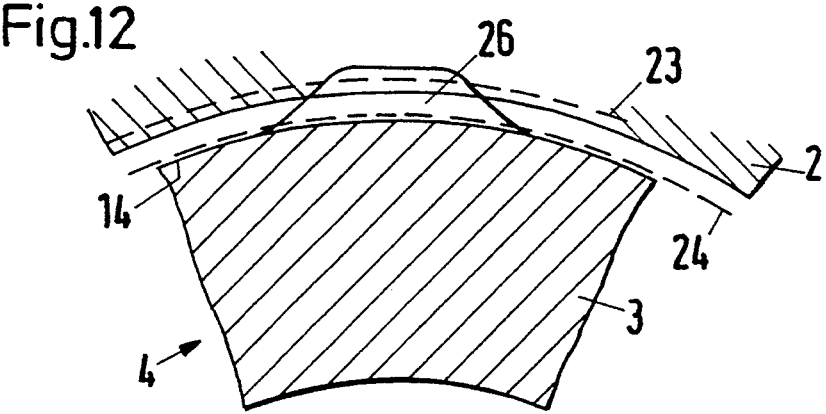
FIG. 12 shows an enlarged, sectional representation of the profile of FIG. 10 to safeguard against twisting.

In FIGS. 10 to 12, the inner supporting part 14 is shown in cross section. It is clear that the contour deviates from the circular. On the circumferential surface of the inner supporting part 14, several holding cams 26 are provided, which can be constructed with different cross sectional profiles (FIGS. 10 and 11). The enlarged detailed representation of FIG. 12, in conjunction with FIG. 6, illustrates that the composite pipe 2 can be brought by means of the holding cams 26 in the play region, which is indicated by the lines 23, 24, into a sufficiently stable pre-installation position, so that, after the pressure sleeve 6 (FIG. 8) is positioned, the pipe connection 1 as a whole can be produced. After that, the holding cams 26 advantageously secure the pipe connection 1 against twisting.

In FIGS. 6 to 8, a ring-shaped body 19″, with which the sealing properties of the pipe connection 1 are improved further, is disposed between the shoulder 10 and the end face 7 of the composite pipe 2. When multilayer composite pipes, particularly aluminum/plastic composite pipes, are compressed, the ring-shaped body 19″ forms a separating element, with which galvanic contact between different metals in the region of the pipe connection 1 can be repressed to such an extent, that corrosion phenomena are reliably avoided.

I claim:

1. A pipe connection for composite pipes comprising:
   a) a supporting sleeve extending in an axial direction and including:
      i) a shoulder,
      ii) at least one connection region each connection region including:
         A) an outer end,
         B) an external, at least essentially cylindrical working, support surface, which is defined by an inner supporting part adjoining the shoulder, an outer supporting part adjacent to the outer end of the connection region, and an intermediate part between said inner and outer supporting parts, said intermediate part having an intermediate part diameter,
         C) main ring-shaped beads in said intermediate part, said main ring-shaped beads being separated from one, another to form an annular channel therebetween, said main ring-shaped beads having a diameter greater than said intermediate part diameter,
         D) additional ring-shaped beads axially separated from one another in said intermediate part and having a diameter greater than said intermediate part diameter, the axially separated additional ring-shaped beads forming an accommodating groove therebetween, said additional ring-shaped beads being axially spaced from said main ring-shaped beads,
         E) an elastomeric ring-shaped body positioned in said accommodating groove,
   b) a plastically deformable pressure sleeve assigned to each connection region, the pressure sleeve, in a position adjacent to the shoulder, embracing an end of a pipe that is positioned on the connection region, the pressure sleeve, in a state before deformation, being constructed as a cylindrical body of constant diameter, and in a final state of the pipe connection, including ring-shaped, inwardly directed depression regions, which are axially offset, and which sealingly immobilize the pipe end by providing an undulating deformation of a wall of the pipe between the supporting sleeve and the pressure sleeve, with at least one depression region of the compression sleeve being assigned to said annular channel and at least one other depression region of the compression sleeve overlying said intermediate part at a location spaced from said annular channel, whereby said pipe is captured and sealingly immobilized between said deformed pressure sleeve, and said connection region.

2. The pipe connection of claim 1, wherein the main ring-shaped beads protrude outwardly in a radial direction, to a greater extent than regions of the intermediate part of the supporting sleeve which adjoin said main ring-shaped beads.

3. The pipe connection of claim 1, wherein the each said accommodating groove has a bottom with a bottom diameter, and the bottom diameter of each said accommodating groove is less than the intermediate part diameter.

4. The pipe connection of claim 1, wherein, before complete deformation of the pressure sleeve, the elastomeric ring-shaped bodies each protrude outwardly in a radial direction, to a greater extent than each said additional ring-shaped beads.

5. The pipe connection of claim 1, wherein each said accommodating groove has a cross-sectional area, and said elastomeric ring-shaped body has a cross sectional area which is less than the cross sectional area of each respective said accommodating groove.

6. The pipe connection of claim 1, wherein each said connection region includes one pair of said main ring-shaped beads and each of said connection regions includes one pair of said additional ring-shaped beads.

7. The pipe connection of claim 1, wherein there are two said connection regions, and the distance between the main ring-shaped beads of one connection region and a respective main ring-shaped beads of the other connection region in said axial direction is greater than the distance between the additional ring-shaped beads of said one connection region and the respective additional ring-shaped beads of said other connection region in said axial direction.

8. The pipe connection of claim 1, wherein the distance between the main ring-shaped beads of each said connection region is greater than the distance between the adjacent additional ring-shaped beads of the same connection region.

9. The pipe connection of claim 1, wherein all parts of the support surface of each said connection region have boundary edges which are beveled.

10. The pipe connection of claim 1, wherein the main ring-shaped beads have circumferential surfaces, which are part-circular in axial section.

11. The pipe connection of claim 1, wherein the main ring-shaped beads have a rectangular cross sectional shape.

12. The pipe connection of claim 1, wherein the outer end of each said connection region has an internal conical hub, which extends to an outer end face of the respective said connection region, and each said connection region has a conical wall which connects the internal conical hub with the outer supporting part thereof.

13. The pipe connection of claim 1, wherein the inner supporting part of the supporting sleeve includes a conical abutting surface adjacent said intermediate part.

14. The pipe connection of claim 1, wherein the inner supporting part of the supporting sleeve has a radial dimension which is greater than radial dimensions of the intermediate part and the outer supporting part.

15. The pipe connection of claim 1, wherein the inner supporting part, the outer supporting part and the main and additional ring-shaped beads of the supporting sleeve have a circular contour in radial section.

16. The pipe connection of claim 1, wherein at least one of the inner supporting part, the outer supporting part and the main ring-shaped beads have a contour in radial section, which deviates from a circular configuration.

17. The pipe connection of claim 1, wherein the shoulder of the supporting sleeve includes centering shoulders for receiving a pressing tool used to form said depression regions in the pressure sleeves.

18. The pipe connection of claim 17, wherein the centering shoulders are formed by diverging side walls which extend outwardly in a radial direction.

19. The pipe connection of claim 17, wherein the centering shoulders are formed by side walls of a centering groove.

20. The pipe connection of claim 1, wherein said pipe has an end face, and further comprising another elastomeric ring-shaped body disposed between the shoulder and said end face of each pipe.

* * * * *